United States Patent

[11] 3,611,328

[72] Inventor Robert J. Spain
Needham Heights, Mass.
[21] Appl. No. 889,247
[22] Filed Dec. 30, 1969
[45] Patented Oct. 5, 1971
[73] Assignee Compagnie Internationale pour L'Informatique
Louveciennes, France
[32] Priority Dec. 30, 1968
[33] France
[31] 181.590

[54] BINARY-CODED MAGNETIC INFORMATION STORES
7 Claims, 7 Drawing Figs.

[52] U.S. Cl. ....................................................340/174TF,
340/174 SR, 340/174 ZB
[51] Int. Cl. ....................................................G11c 11/14,
G11c 19/00
[50] Field of Search ........................................ 340/174
TF, 174 SR

[56] References Cited
UNITED STATES PATENTS
3,500,347 3/1970 Schweizerhof .............. 340/174

*Primary Examiner*—James W. Moffitt
*Attorney*—Kemon, Palmer & Estabrook

ABSTRACT: A plurality of parallel, uniformly spaced paths of anisotropic ferromagnetic material are carried by and extend over a supporting base member and define thereon circulating magnetic registers, each comprising at least two adjacent ones of said paths. A step-by-step control of the circulation of information bits in said registers is achieved by providing at least two zigzag-shaped conductors arranged over the magnetic paths with their conductor segments at 45° with respect to the length of paths over the base member, and said conductor segments being oriented at 90° with respect to each other.

INVENTOR
ROBERT J. SPAIN

BY
ATTORNEYS

INVENTOR
ROBERT J. SPAIN

BY [illegible]
ATTORNEYS

BINARY-CODED MAGNETIC INFORMATION STORES

BACKGROUND OF THE INVENTION

The present invention concerns improvements in or relating to binary-coded information stores in which the binary values "O" and "1" are represented by reversed orientations of the magnetization vector along the easy magnetization axis of an anisotropic ferromagnetic material, and wherein the ferromagnetic material is arranged to define information circulating channels or paths by a controlled progression therein of the boundaries of the bit magnetization zones.

BRIEF SUMMARY OF INVENTION

An information store in accordance with the present invention includes a plurality of anisotropic magnetic film paths extending parallel to each other across a supporting base member with at least two successive paths in said plurality being connected by at least one of their ends to define a plurality of circulating registers in the store, and at least two zigzag-shaped conductors extending over said plurality of paths in close proximity thereto with their conductor segments crossing each other at 90° the conductor segments of the other one of said conductors, and the conductor segments of both said conductors crossing the film paths at an angle of 45°.

It is the principal object of the invention to provide a new and compact structure for stores of this kind, comprising on a supporting base member a plurality of circulating paths extending parallel to each other and forming registers, each register comprising at least two adjacent such paths and a single controlling arrangement for ensuring circulation of the information bits in any and all paths of the registers.

BRIEF DESCRIPTION OF THE DRAWINGS

The invention will be described in detail with reference to the accompanying drawings, in which.

DETAILED DESCRIPTION

The examples shown and to be described herein concern a planar structure but it must be understood that the invention is not restricted to such geometry since warped or curved geometries may be adopted when required and one such example would be a cylindrical configuration.

Figure 1:
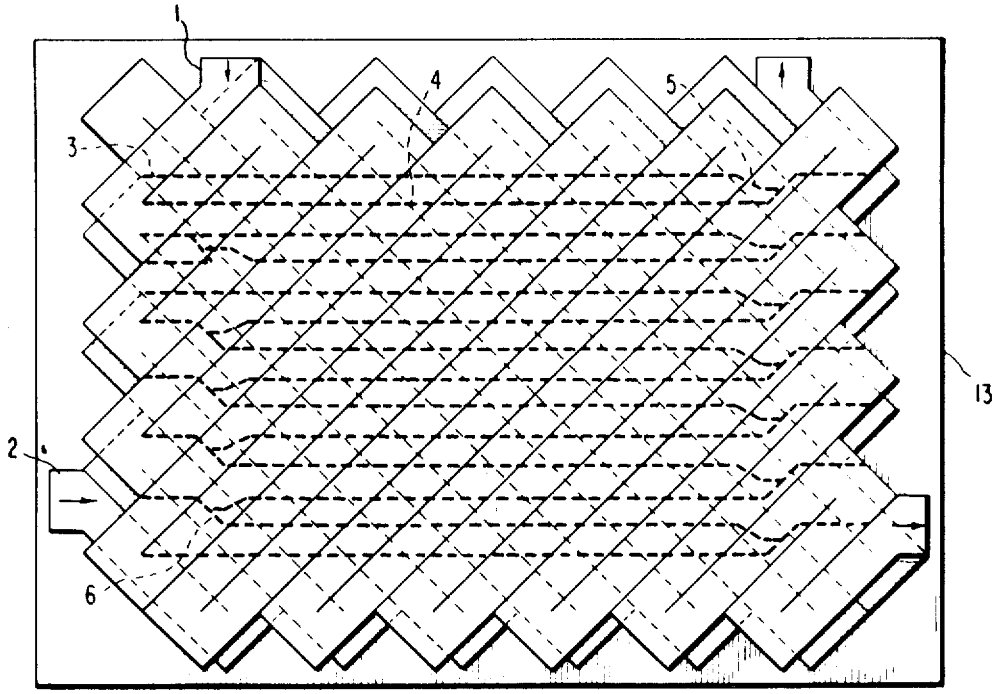
FIG. 1 is a plan view of a store according to the invention.

In the example of FIG. 1, some possible combinations of circulating magnetic paths are shown for forming various kinds and lengths of circulating registers. It must be understood that any configuration, derived from the one illustrated, may be used in a store made according to the present invention.

It must also be understood that for the sake of clarity, only a few of the magnetic paths are shown compared with those in an actual embodiment.

Finally, the read-in, readout and erasure means are not shown in the drawings. As is well known, the read-in means and the readout conductor means may consist of planar inductive loops or small coils over the ends of the magnetic paths. Erasure may be effected by the passage of a suitably high current through a coil surrounding the entire structure, and having its turns substantially orthogonal to the direction of the magnetic paths. Such application of electrical current will create a magnetizing field which will bring the magnetic material of the paths at any location thereon back to a magnetization condition conventionally assumed as representing the binary value 0. However, such a coil may be omitted when no overall erasure is needed for the operation of the store. When provided, such a coil may be used for application of a low intensity direct current favoring the 0 magnetic condition of the magnetic material though not disturbing the 1 localized magnetized zone. Favoring one magnetic condition over two may aid in the definition of the zones wherein binary values 1 have been recorded.

Figure 1A:
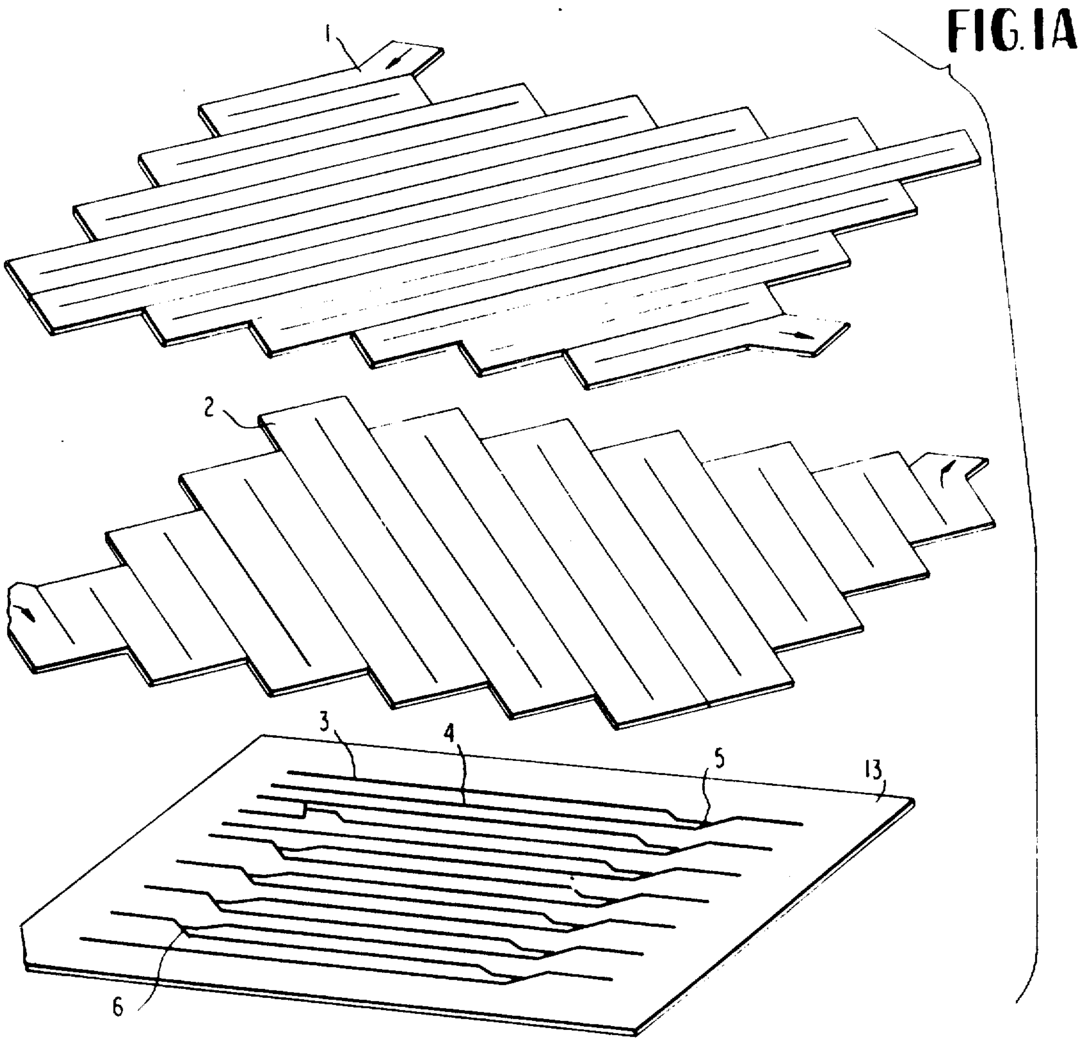
FIG. 1A is an exploded perspective view of portion of the store of FIG. 1.

Essentially the structure of a store according to the present invention comprises:

a. a plurality of information circulating ferromagnetic channels or paths which extend parallel to one another across a supporting base member and of equispaced distribution in the other direction. Illustratively, fourteen such paths are shown in FIGS. 1 and 1A under the reference numerals 3 and 4 which apply to the two upper paths in the drawing;

b. a first zigzag-shaped conductor 1 (FIG. 1A) from an input terminal of electrical current pulses ($i_A$, FIG. 4) at the upper left to an output terminal at the lower right of FIG. 1. Said conductor is preferably made of a metallic deposit or thin layer coating substantially the entire surface of a thin dielectric sheet such as shown at 15 in FIG. 3. The lines which define the shape of said conductor in FIGS. 1 and 3 represent interruptions in the metallic coating (preferably copper), according to a known and accepted representation for printed circuitry. Such a conductor design has a very low self-inductance and is particularly suitable for a control of electrical current pulses under low voltage but with relatively high current values;

c. a second zigzag conductor 2 as shown in FIG. 1A having its conductor segments oriented at 90° to the orientation of the conductor segments of the first, the second conductor being of similar configuration to the first and connecting an input terminal, bottom left, to an output terminal, upper right in FIG. 1.

Figure 3A:
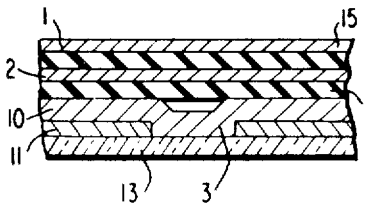
FIGS. 3A, 3B and 3C show, in cross-sectional views, three possible structural embodiments for the magnetic paths in the store.
Figure 3B:
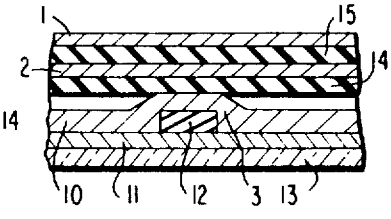
Figure 3C:
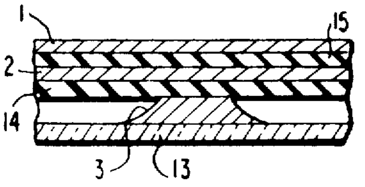

The conductors are superimposed but electrically separated by a thin insulating substrate which is identified by the reference numeral 15 in FIGS. 3A, 3B, and 3C. Looking at this assembly in the plan view of FIG. 1, it will be seen that the magnetic paths, 14 of which are shown in this figure, extend substantially from edge to edge of the substrate and are substantially parallel to one another. Taking the uppermost path 3, this path is a line which is the locus of points which can be defined as follows. Each point is formed by the intersection of a line separating the closely spaced segments of conductor 1 with a line at 90° to the first and lying substantially midway between the lines separating the closely spaced segments of conductor 2. The second uppermost magnetic path 4 similarly extends parallel to the first but spaced therefrom a distance such that the direction of the electrical current in one of the control conductors is reversed with respect to the direction of the electrical current under (or above) the first path, and so forth to the bottom of the structure shown. The length of a memory point or zone along a path, i.e. a magnetization zone representing a binary digit, approximates the distance between two intersections of the lines forming the separations between adjacent conductor segments in the control conductors 1 and 2. The spacing between two significant digit magnetization zones has about the same value as the length of the significant digit zones.

Each circulating magnetic path may be made as shown on one of the cross section views of FIGS. 3A, 3B and 3C. Referring to FIG. 3A, a first aluminum film 11 of about 600 A. thickness has been deposited over a dielectric carrier plate 13 as for instance a glass plate. This layer is then photoetched to form the pattern of the desired magnetic paths. A film 10 of ferromagnetic material such as an iron-nickel-cobalt alloy may be electrochemically deposited on the film 11. The thickness of the film 10 is not particularly critical and may lie between a few hundreds and a few thousands of angstrom units. As is conventional, uniaxial anisotropy of the film with the easy axis of magnetization lying along the length thereof is assured by a thermal treatment under a DC orienting magnetic field.

According to FIG. 3B, 11 is a continuous layer of soft ferromagnetic material, such as an iron-nickel-cobalt alloy which is coated with undulating bands such as 12 oriented along the directions of the desired magnetic circulating paths and over such layer and such bands or strips is formed a film of a hard ferromagnetic material, for instance a nickel-iron-alloy. All thicknesses are of the order hereinbefore mentioned. The insulating strips may be made as follows. A photosensitive layer of the nature of the photosensitive resists as used in printed circuitry etching techniques is coated over film 11. A mask protecting the pattern of the desired paths is applied over the resist layer which is thereafter insulated and then developed and washed so that only the resist strips remain. Each path is consequently defined by the decoupled strips between the soft and hard ferromagnetic films. Anisotropic orientation is obtained either during deposition of said layers or thereafter by application of heat concurrently with application of an orienting field.

According to FIG. 3C, the ferromagnetic paths are directly formed over the substrate 13 from deposition, in the presence of an orienting magnetic field, of strips of the chosen material. The edges of the paths are tapered as shown.

To complete the structure of the store, the path-carrying surface is coated with a thin insulating layer 14. Over layer 14 there is applied a thin sheet 15 of dielectric material coated by a printed circuit technique on both its faces by the metal layers in the patterns of conductors 1 and 2. On the appropriate ends of the channels or paths have been applied, although not shown, the read-in and readout loops which are made by metallizing thin dielectric strips for instance and consequently "clamped" between the ends of the magnetic paths and the dielectric sheet or layer 14.

Figure 2:
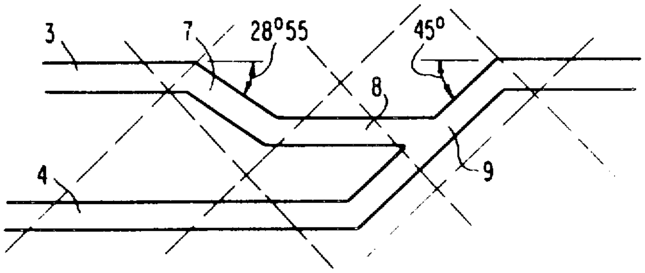
FIG. 2 shows an example of a magnetic film circuit interconnecting two of the magnetic paths in said store.

The magnetic bridges such as 5 and or 6 in FIG. 1 enabling the circulation of information bit zones along the registers are, of course, formed simultaneously with the magnetic paths proper. Each path constitutes per se an elementary circulating register or, more specifically, shift register as will be hereinafter explained in further detail. However, a structure according to the present invention enables such paths to be connected, and controlled as registers having at least two interconnected paths, the direction of advance of the information bits being, of course, reversed from path to path although only a single control arrangement is used. In FIG. 1, by way of example, there is shown a two path open loop register, a two-path looped, or recirculating register, and a more lengthy register made of 10 serially connected paths. The geometry of a bridge such as shown at 5 in FIG. 1 interconnecting two paths is illustrated in FIG. 2. The geometry of a bridge such as shown at 6 in FIG. 1 is the mirror image of the bridge shown in FIG. 2.

From a place near one end of a path such as 3, over a crossing of two conductor segment intervals in conductors 1 and 2 (taking FIG. 1 as a lower plan view of the overall structure), the path is deviated as shown at 7 in FIG. 2, for instance at an angular orientation of about 28°55′ from the direction of path 3 on a length which in said new direction substantially traverses one conductor segment of one of the conductors 1 and 2 (the widths of conductor segments is assumed the same in both 1 and 2), and then the magnetic path is redeviated at 8 to extend parallel to 3 up to a location where it "merges" with a 45° slanted portion of the next path 4 in the overall pattern. This may advantageously extend for a noncritical length parallel to and on the same level as path 3. The point of connection of 8 and 9 is substantially equispaced from both the paths 3 and 4 in the direction transverse to such paths, and also substantially at the middle portion of the conductor segments of 1 and 2 at this location.

Figure 4:
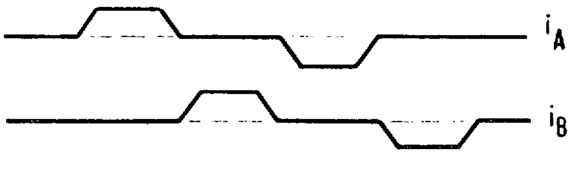
FIG. 4 shows the relative wave shape and phase relation of the control currents for information circulation in the registers of the store.

FIG. 4 shows the waveforms of a cycle of control current for a store such as described, for controlling the advance or shift of one information bit by one step along a path. Two electrical current pulses $i_A$, the first positive and the second negative, are applied to conductor 1 and two other electrical current pulses, $i_B$, the first positive and the second negative, are applied to conductor 2 in a phase relation therebetween as indicated in the Figure. It will be noted that the two positive pulses do not overlap and the same is true for the two negative pulses. Any information bit is defined, in a magnetic path, by a zone of a defined magnetization orientation delineated by magnetization boundaries, one at the beginning and the other at the end of the zone, at least for the representation of a binary value 1. The representation of a binary value 0 may be the general magnetization condition of the material of the path. Each control pulse produces a simultaneous advance or progression of the two boundaries but the distance of displacement is limited in each instance to the interval between two gaps in the metallization of the conductors, because the magnetic control field created by such a pulse in the path substantially turns to zero at such locations. A magnetization zone boundary consequently advances in two steps from a gap in one of the conductors to the next gap in the same conductor. The polarity reversal for the next advance is due to the reversal of the current orientations in the next following segments of the control conductors which are obviously of reversed orientation with respect to the first concerned segments in the control conductors. The alternation of action of the two currents is clear from the alternation of the actions of the conductor segments in the two control conductors along a path. It will also be clear that the bit information location along any path must be separated by zones of substantially identical length, and such zones must be preserved. It is useful therefore to have a "step" or "elementary shift" equal to twice the length of a bit information zone and hence the necessity of the two pairs of pulses for each step control.

In a store structure having magnetic channels or paths of a width of about 50 microns, it is possible to obtain a density of information bits as high as about 800 bits per square centimeter With pulse currents of the order of about 400 milliamperes, a control shift or step cycle will have a length substantially equal to 1 or 2 microseconds.

Applicant claims the benefit of a full range of equivalents within the scope of the appended claims.

I claim:

1. A binary data information store comprising in combination:

a. an insulating base member;

b. a plurality of anisotropic magnetic film paths extending substantially parallel and in spaced relation to one another across said base member and interconnected in at least pairs at one end thereof to define a plurality of circulating registers;

c. a first control conductor disposed in a plane which is parallel and adjacent to said film paths but electrically insulated therefrom, said conductor being formed of a plurality of elongated adjoining segments parallel to each other separated by narrow gaps and so interconnected at their ends that current flow in each successive segment is in a direction opposite to that of the preceding segment, said segments making an acute angle with said film paths; and d. at least a second control conductor of substantially similar configuration to said first, said second conductor being parallel and adjacent to but electrically insulated from said first conductor with its segments lying at an angle of 90° to those of said first conductor.

2. A binary data information store according to claim 1 in which each of said film paths substantially throughout its length is the locus of points defined by the intersection of the gaps separating adjoining segments of one control conductor with imaginary lines parallel to and spaced midway between the gaps separating adjoining segments of the other of said control conductors, said points being projected into a plane adjacent to and parallel to the plane of said control conductors.

3. A binary data information store according to claim 1 wherein each of said control conductors consists of a metallic coating on an insulating surface, said conductor segments being defined by parallel elongated narrow gaps in said metallic coating.

4. A binary data information store according to claim 1 wherein each of said film paths consists of a film deposition of the desired pattern of said path on a smooth-surfaced carrier.

5. A binary data information store according to claim 1 wherein said film paths each consist of a soft ferromagnetic material strip on a dielectric substrate which has previously been uniformly coated with a thin metallic layer except at the locations of said paths, said soft ferromagnetic film further coating the complete metallic surface outside said paths.

6. A binary data information store according to claim 1 wherein each of said film paths consists of a hard ferromagnetic strip and a soft ferromagnetic strip, said strips being separated by a dielectric film, both said hard and said soft ferromagnetic material further coating the complete surface of said base member.

7. A binary data information store according to claim 1 wherein said interconnections between said film paths are formed without discontinuity of the film paths interconnected and each comprises a change in direction of one of the paths followed by a merger with a portion slanted at about 45° between the ends of paths interconnected.